United States Patent
Daniel et al.

(10) Patent No.: US 8,001,534 B2
(45) Date of Patent: Aug. 16, 2011

(54) NON-INTRUSIVE VALIDATION OF SOFTWARE USED BY MIDDLEWARE PROVIDERS

(75) Inventors: Bryan S. Daniel, Frisco, TX (US); Doug E. Phillips, Euless, TX (US)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 11/548,892

(22) Filed: Oct. 12, 2006

(65) Prior Publication Data

US 2008/0091673 A1 Apr. 17, 2008

(51) Int. Cl.
*G06F 9/45* (2006.01)
(52) U.S. Cl. ........................................ 717/128
(58) Field of Classification Search ................... 717/128
See application file for complete search history.

(56) References Cited

U.S. PATENT DOCUMENTS

| 7,603,653 B2 * | 10/2009 | Sundararajan et al. | 717/105 |
| 2005/0216882 A1 * | 9/2005 | Sundararajan et al. | 717/104 |
| 2009/0113395 A1 * | 4/2009 | Creamer et al. | 717/126 |

* cited by examiner

*Primary Examiner* — John Chavis
(74) *Attorney, Agent, or Firm* — Yee & Associates, P.C.; Matthew B. Talpis

(57) ABSTRACT

A computer implemented method, data processing system, and computer usable program code are provided to validate software compliance for a set of technologies. A request is received to validate software. Responsive to receiving the request to validate the software, a selection of a number of technologies is received from the set of technologies for which the software is to be validated. Responsive to receiving the select of the number of technologies, a set of traces is exercised of the software for the selected technologies. The exercise of the set of traces continues until stopped. Responsive to tracing stopping, a set of trace log files of the set of traces is created and sent to a validation server. The validation server then analyzes the submitted trace log files and generates a report detailing what technologies were successfully used.

20 Claims, 4 Drawing Sheets

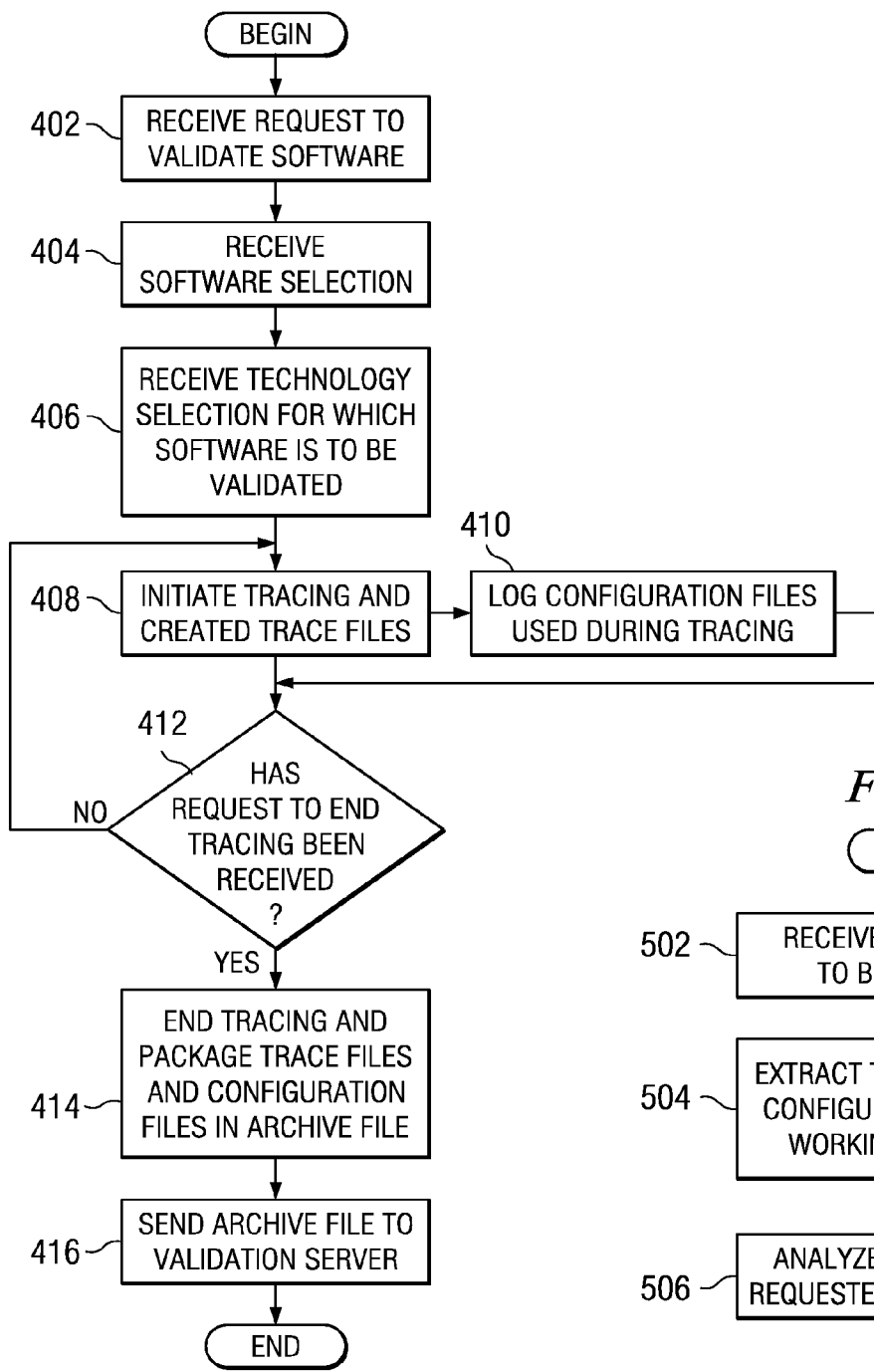

SOFTWARE VALIDATION REPORT

Partner: Partner ABC
Application: Engagement Tracking
NAV Code: BTRKJD

Results

Results are reported as either PASS, INCONCLUSIVE, or UNDETECTED. PASS means that everything claimed was detected. INCONCLUSIVE means that some (but not all) items were detected. UNDETECTED means that none of the items claimed were detected to be using the specified technology.

The following list depicts the technologies claimed to have been used and whether or not they were detected during the validation process.

604 {
  PASS JSR168 : AcctEngIncPortlet portlet *(detected)*
  Engagement Search Portlet *(detected)*
  Worklists Portlet *(detected)*

The following list depicts the custom themes and skins claimed to have been developed and whether or not they were detected during the validation process.

606 {
  PASS Themes : WebSphere *(detected)*

---

The following depicts how the portlets, themes, and skins were used with the different markup languages:

608 {

| [-] HTML | [-] WML | [-] CHTML |
|---|---|---|
| [-] Skins | [-] Skins | [-] Skins |
| • Outline<br>• Echo | • - none found - | • - none found - |
| [-] Themes | [-] Themes | |
| • WebSphere<br>• Admin with left navigation | • - none found - | • - none found - |
| [-] Portlets | [-] Portlets | |
| • Engagement Search Portlet<br>• AcctEngIncPortlet Portlet<br>• Worklists Portlet<br>• Create Engagement Record Portlet<br>• WP Validation Portlet | • - none found - | • - none found - |

NON-INTRUSIVE VALIDATION OF SOFTWARE USED BY MIDDLEWARE PROVIDERS

BACKGROUND OF THE INVENTION

1. Field of the Invention

The present invention relates generally to software validation. More particularly, the present invention relates to a computer implemented method, data processing system, and computer usable program code for a non-intrusive validation of software that is used by middleware providers.

2. Description of the Related Art

Current validation programs, such as WebSphere® Portal and IBM Workplace™, allow partners that have software solutions for middleware providers to obtain a "Ready For" branding. The process requires that partners document what middleware technologies are leveraged within their software solution and involves a manual inspection. Validation of software prepared by partners allows for the software to be provided to consumers faster.

Validation of such technologies may be done visually through meetings or even by code inspection within a testing lab. The process is slow, does not provide for self-validation, and is may be intrusive to the developed partner software. For example, as part of the process, a partner would submit the entire software program for processing.

A main disadvantage of such traditional approaches is that the process may require the inspection of software that may be considered confidential by the partner. In addition, the manual inspection of software significantly adds to the time needed to complete the process.

SUMMARY OF THE INVENTION

The different aspects of the illustrative embodiments provide a computer implemented method, data processing system, and computer usable program code for validating software compliance for a set of technologies. The illustrative embodiments receive a request to validate software. The illustrative embodiments receive a selection of a number of technologies from the set of technologies the software is to be validated for in response to receiving the request to validate the software. The illustrative embodiments exercise a set of traces of the software for the selected technologies in response to receiving the select of the number of technologies. Exercising the set of traces continues until stopped. The illustrative embodiments create a set of trace log files of the set of traces in response to tracing stopping. The illustrative embodiments send the set of trace log files to a validation server. The validation server then analyzes the submitted trace log files and generates a report detailing what technologies were successfully used.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates a flowchart of the operation performed by a validation client application in accordance with an illustrative embodiment;

FIG. 5 illustrates a flowchart of the operation performed by a validation server application in accordance with an illustrative embodiment; and FIG. 6 depicts an exemplary software validation report in accordance with an illustrative embodiment.

DETAILED DESCRIPTION OF THE PREFERRED EMBODIMENT

Figure 1:
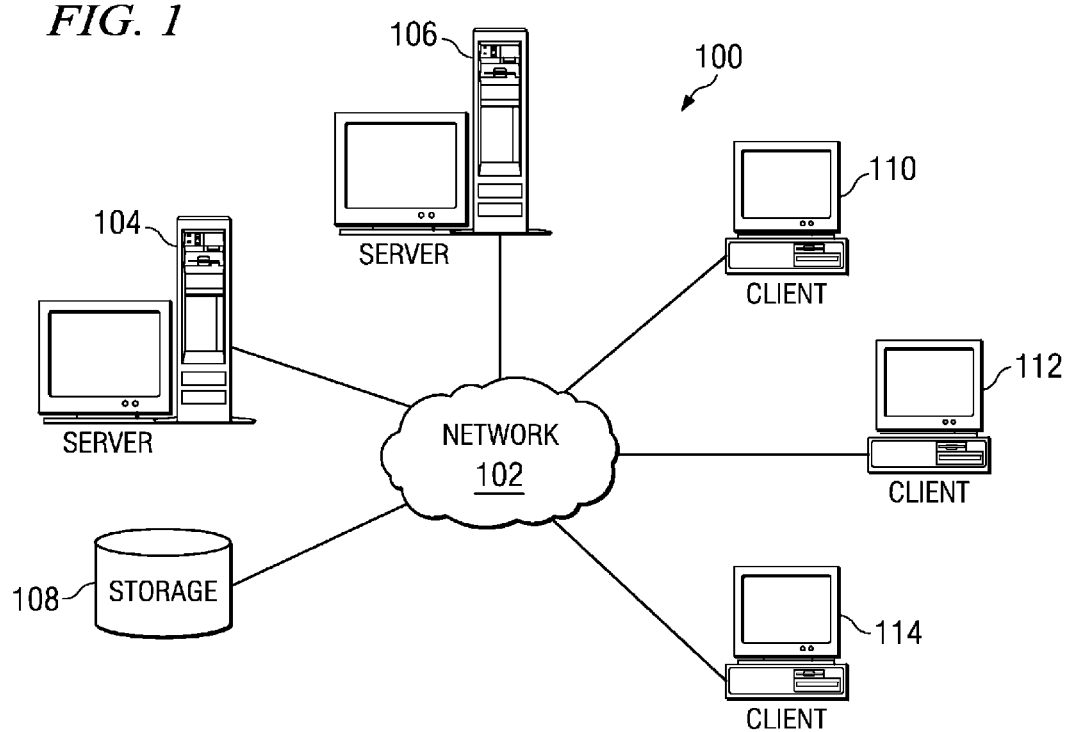
FIG. 1 depicts a pictorial representation of a network of data processing systems in which illustrative embodiments may be implemented.
Figure 2:
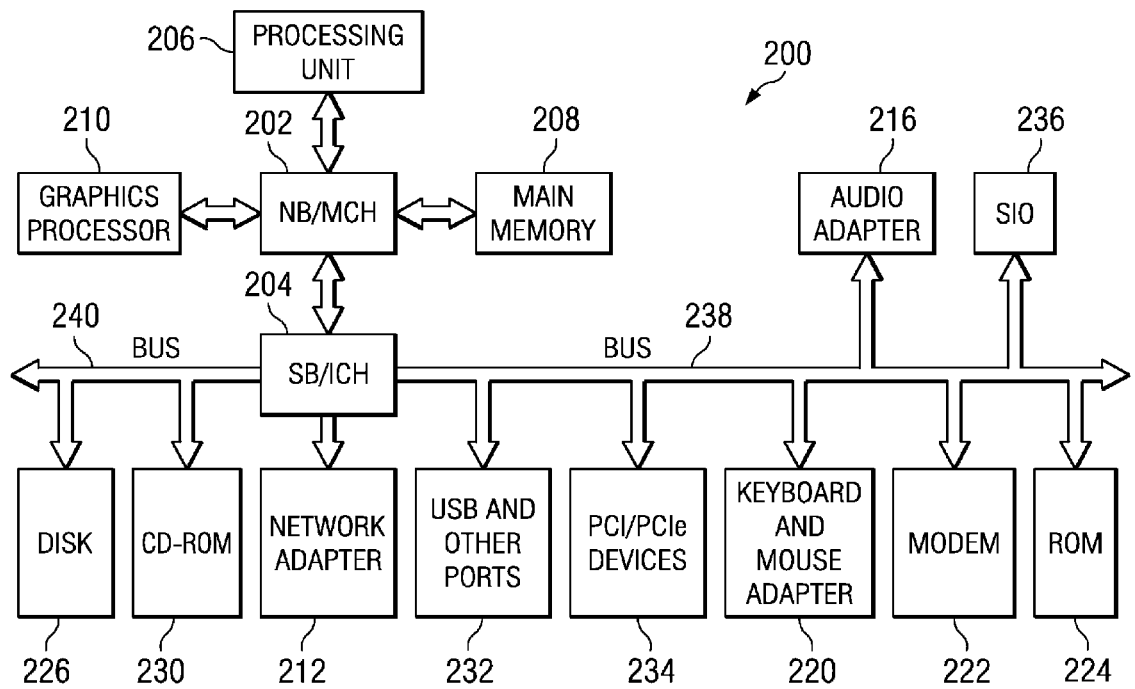
FIG. 2 shows a block diagram of a data processing system in which illustrative embodiments may be implemented.

The illustrative embodiments provide for non-intrusive validation of software that is used by middleware providers. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as configuration files and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adaptor 212 is coupled to south bridge and I/O controller hub 204 and audio adaptor 216, keyboard and mouse adaptor 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adaptors, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adaptor. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for validating software compliance for a set of technologies. A validation client application receives a request to validate software. The validation client application also receives a selection of a number of technologies for which the software is to be validated. The validation client exercises a set of traces of the software for the selected technologies until exercising of the set of traces stops. Then the validation client application creates a set of trace log files for the set of traces. Finally, the validation client application sends the set of trace log files to a validation server application.

Figure 3:
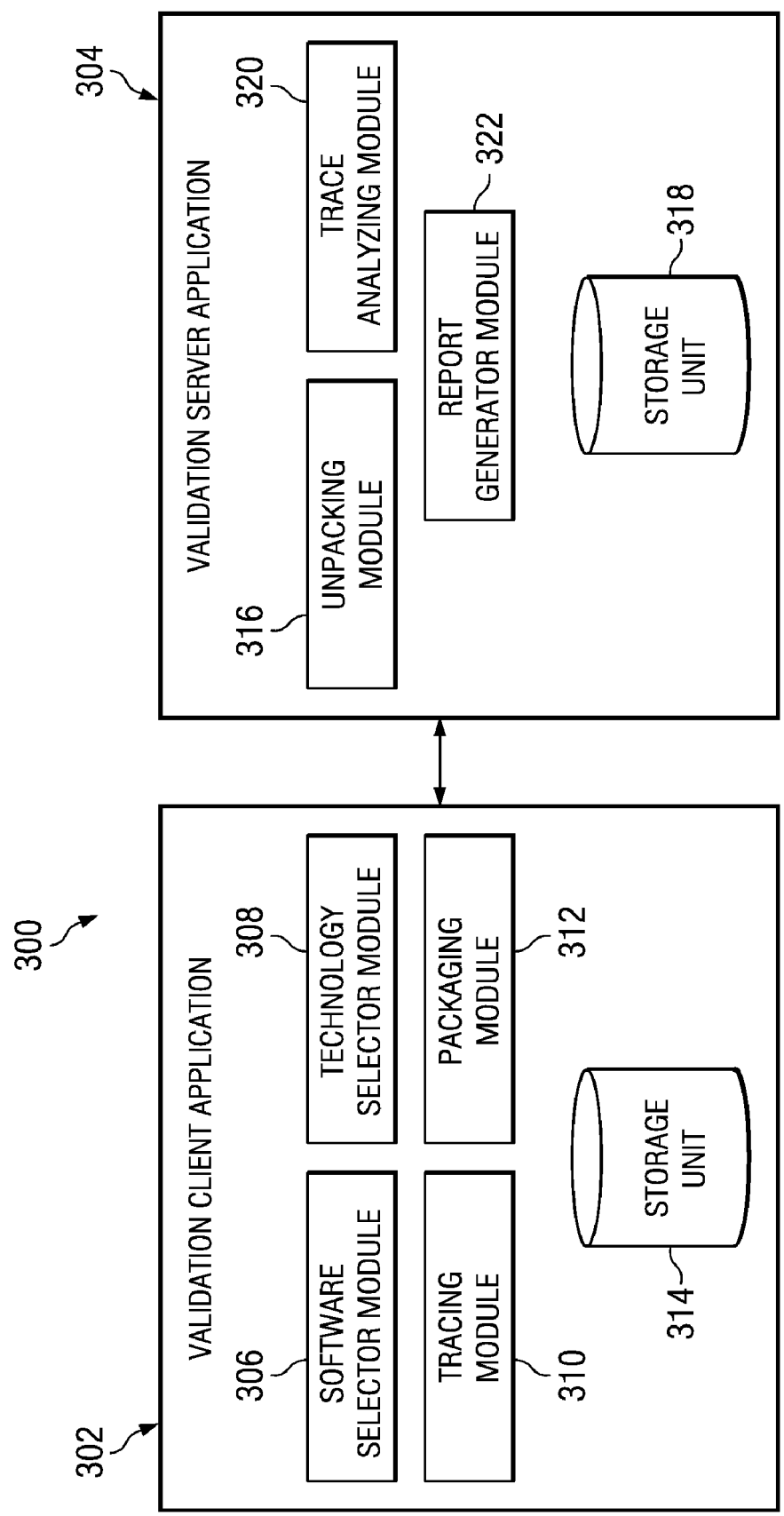
FIG. 3 depicts a functional block diagram of a software validation program in accordance with an illustrative embodiment.

FIG. 3 depicts a functional block diagram of a software validation program in accordance with an illustrative embodiment. Software validation program 300 involves the use of validation client application 302 and validation server application 304. Validation client application 302 is an application executed by a data processing system, such as data processing system 200 of FIG. 2. Validation client application 302 is comprised of software selector module 306, technology selector module 308, tracing module 310, packaging module 312 and storage unit 314.

When a partner executes validation client application 302, software selector module 306 is executed and prompts the partner for the software the partner intends to validate. Once the software is selected, technology selector module 308 then prompts the partner to select the technologies, such as Java™ DataBase Connectivity (JDBC), Java™ Specification Request (JSR) 168 (JSR 168), Click-to-Action, or Web-clipping, for which the user wants the software validated. The user may select one or more technologies if appropriate.

Technology selector module 308 uses the selected technologies to dynamically set the required level of middleware software tracing in tracing module 310. With the software and technologies selected, tracing module 310 initiates tracing for the selected software and displays the tracing status to the partner. Some exemplary middleware software traces are WebSphere® Application server, WebSphere® Portal server, Database JDBC, or Lightweight Directory Access Protocol (LDAP) traces. The initiating of the tracing may be manually started by the partner or automatically started upon selection of a technology. Tracing module 310 monitors the selected technologies and creates tracing files until the tracing is stopped.

During tracing, tracing module 310 also logs any configuration files that are accessed during operation of the software. Both the tracing files and the configuration files are stored in a working directory on storage unit 314. The tracing may be stopped either manually by the partner, after a preset amount of time, or when tracing module 310 detects an indicator, such as a flag or keyword. The indicator may be provided by the partner or preset in validation client application 302.

After the selected technologies have been exercised, packaging module 312 gathers the resulting traces, as well as any other relevant configuration files, and packages those files into an archive file, such as a Java™ Archive file (.jar), a zip file (.zip), or the like. Once packaging module 312 creates the archive file, packaging module 312 sends the archive file to the validation server application 304. The archive file may be delivered to the validation server application 304 through any means, including, but not limited to Hypertext Transfer Protocol (HTTP) upload, Simple Mail Transfer Protocol (SMTP) delivery, or File Transfer Protocol (FTP) delivery. Prior to sending the archive file, a level of encryption may be added to the archive file which is known to the middleware provider. The encryption provides a level of security that ensures that no-one other than the partner or middleware provider is able to see the tracing results.

Validation server application 304 is comprised of unpacking module 316, storage unit 318, trace analyzing module 320, and report generator module 322. Validation server application 304 is an application executed by a data processing system, such as data processing system 200 of FIG. 2. Validation server application 304 receives the archive file in unpacking module 316. Unpacking module 316 proceeds to unpack the archived files to storage unit 318 and notifies trace analyzing module 320 that trace files are ready to be analyzed. Trace analyzing module 320 then analyzes all the files contained in the archive file and determines which technologies were detected to be successfully used.

Upon completing the analysis, report generator module 322 generates a report detailing the results, such as which technologies were detected and undetected, and sends this report to the appropriate persons. The reports generated by report generator module 322 may be in a form such as Portable Document Format (PDF), HyperText Markup Language (HTML), text, or the like. Report generator module 322 may also encrypt the reports to provide a level of security that ensures that no-one other than the appropriate persons receiving the report is able to see the tracing results.

FIG. 4 illustrates a flowchart of the operation performed by a validation client application in accordance with an illustrative embodiment. The validation client application is a client side validation application, such as validation client application 302 of FIG. 3.

As the operation begins, the validation client application receives a request from a partner to validate a piece of software (step 402). The validation client application prompts the partner to select the software for validation (step 404). The validation client application then prompts the partner to select the technologies for which the user wants the software validated (step 406). The user may select one or more technologies for validating the software against. The technologies selected by the partner dynamically sets the required level of middleware software tracing that is to be performed.

The validation client application then initiates middleware software tracing for the selected software using the required level of tracing, displays the tracing status to the partner, and creates tracing log files (step 408). At the same time that the tracing is being performed, the validation client application logs any configuration files that are accessed by the software during the tracing (step 410). The initiating of the tracing may be manually started by the partner or automatically started upon selection of the technology. The technology is exercised until the tracing is stopped (step 412). Both the tracing files and the configuration files are stored in a working directory for later access. The tracing may be stopped either manually by the partner, after a preset amount of time, or when an indicator is encountered, such as a flag or keyword. The indicator may be provided by the partner or preset in validation client application. If tracing has not been stopped at step 412, the process returns to step 408.

If at step 412 tracing is stopped, the validation client application gathers the resulting traces, as well as any other relevant configuration files, and packages those files them into an archive file (step 414). Once the archive file is created, the validation client application sends the archive file to a validation server application (step 416), with the operation terminating thereafter. Prior to sending the archive file, a level of encryption may be added to the archive file which is known to the middleware provider. The encryption provides a level of security that ensures that no-one other than the partner or middleware provider is able to see the tracing results.

FIG. 5 illustrates a flowchart of the operation performed by a validation server application in accordance with an illustrative embodiment. The validation server application is a server side validation application, such as validation server application 304 of FIG. 3.

As the operation begins, the validation server application receives an archive file that is to be analyzed (step 502). The validation server application unpacks the archived files to a working directory within a storage unit (step 504) and initiates an analysis of the archive files (step 506). The analysis of the archive files determines which technologies were detected to be successfully used. Upon completing the analysis, the validation server application generates a report detailing the results, such as which technologies were detected and undetected, and sends this report to the appropriate persons (step 508) with the operation termination thereafter. The generated reports may also encrypt to provide a level of security that ensures that no-one other than the appropriate persons receiving the report is able to see the tracing results.

FIG. 6 depicts an exemplary software validation report in accordance with an illustrative embodiment. Software validation report 602 may be a report generated by a validation server application, such as validation server application 304 of FIG. 3. Software validation report 602 indicates to the receiver of the report whether the technologies that were claimed to have been used were actually detected during the validation process in section 604, any custom themes and skins that were claimed to been developed were actually detected during the validation process in section 606, and how any portlets, themes, and skins are were used with different markup languages during the validation process in section 608. In section 604, the technology that was claimed to be used by the partner was JSR168. Also in section 604, the report shows that JSR168 was detected and that JSR168 included three portlets, all of which passed validation. In section 606, the partner claimed to use a WebSphere® theme, which was detected by the validation server application and that the theme passed. In section 608, the report shows that skins, themes, and portlets where used with a HyperText Markup Language (HTML). It should be appreciated that the technologies depicted in section 604 and the themes and skins depicted in section 606 are only exemplary and are not intended to assert or imply any limitation with regard to the technologies in which different embodiments may be validated.

Thus, the illustrative embodiments greatly decreases the time required to validate a partner's software solution and eliminates exposing confidential software. Responsive to receiving the request to validate a partner's software solution and a selection of a number of technologies for which the software is to be validated, the validation client application exercises a set of traces of the software for the selected technologies. Once the exercise stops, the validation client application creates a set of trace log files of the set of traces and sends the set of trace log files to a validation server. The validation server then analyzes the submitted trace log files and generates a report detailing what technologies were successfully used.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of validating software compliance for a set of technologies, the computer implemented method comprising:
    receiving a request to validate software;
    responsive to receiving the request to validate the software, receiving a selection of a number of technologies from the set of technologies for which the software is to be validated;
    responsive to receiving the selection of the number of technologies, exercising a set of traces of the software for the selected technologies, wherein exercising the set of traces continues until stopped;
    responsive to tracing stopping, creating a set of trace log files of the set of traces; and
    sending the set of trace log files to a validation server.

2. The computer implemented method of claim 1, wherein exercising the set of traces of the software further comprises:
    logging a set of configuration files accessed by the software during tracing; and
    sending the set of configuration files to the validation server.

3. The computer implemented method of claim 1, further comprising:
    receiving the set of trace log files at the validation server;
    analyzing the set of trace log files for the selected technologies to form an analysis; and
    generating a report that includes the analysis of the set of trace log files.

4. The computer implemented method of claim 3, further comprising:
    sending the report to a set of individuals.

5. The computer implemented method of claim 1, wherein stopping the tracing is performed by at least one of a manual stop, a preset time stop, or when an indicator is encountered.

6. The computer implemented method of claim 5, wherein the indicator is at least one of a flag or keyword.

7. The computer implemented method of claim 5, wherein the indicator is set by the user.

8. The computer implemented method of claim 5, wherein the indicator is set based on the selection of the one or more technologies.

9. The computer implemented method of claim 1, wherein exercising the set of traces is started by at least one of a manual start or upon selection of the one or more technologies.

10. The computer implemented method of claim 1, wherein the selection of the number of technologies sets the level of tracing to be exercised.

11. The computer implemented method of claim 3, wherein the report is encrypted and wherein the trace log file is encrypted.

12. The computer implemented method of claim 1, wherein the set of trace log files are delivered to the validation server for analysis using at least one of a Hypertext Transfer Protocol, a Simple Mail Transfer Protocol, or a File Transfer Protocol.

13. A data processing system comprising:
    a bus system;
    a communications system connected to the bus system;
    a memory connected to the bus system, wherein the memory includes a set of instructions; and
    a processing unit connected to the bus system, wherein the processing unit executes the set of instructions to receive a request to validate software; receive a selection of a number of technologies from the set of technologies for which the software is to be validated in response to receiving the request to validate the software; exercise a set of traces of the software for the selected technologies in response to receiving the selection of the number of technologies, wherein exercising the set of traces continues until stopped; create a set of trace log files of the set of traces in response to tracing stopping; and send the set of trace log files to a validation server.

14. The data processing system of claim 13, wherein executing the instructions to exercise the set of traces of the software further comprises the processing unit executing the set of instructions to log a set of configuration files accessed by the software during tracing; and send the set of configuration files to the validation server.

15. The data processing system of claim 13, wherein the processing unit executes the set of instructions to receive the set of trace log files at the validation server;
   analyze the set of trace log files for the selected technologies to form an analysis; and generate a report that includes the analysis of the set of trace log files.

16. The data processing system of claim 15, wherein the processing unit executes the set of instructions to send the report to a set of individuals.

17. A computer program product comprising: a tangible computer usable medium including computer usable program code to validate software compliance for a set of technologies, the computer program product including: computer usable program code for receiving a request to validate software; computer usable program code for receiving a selection of a number of technologies from the set of technologies for which the software is to be validated in response to receiving the request to validate the software; computer usable program code for exercising a set of traces of the software for the selected technologies in response to receiving the selection of the number of technologies, wherein exercising the set of traces continues until stopped; computer usable program code for creating a set of trace log files of the set of traces in response to tracing stopping; and computer usable program code for sending the set of trace log files to a validation server.

18. The computer program product of claim 17, wherein the computer usable program code for exercising the set of traces of the software further includes:
   computer usable program code for logging a set of configuration files accessed by the software during tracing; and
   computer usable program code for sending the set of configuration files to the validation server.

19. The computer program product of claim 17, further includes:
   computer usable program code for receiving the set of trace log files at the validation server;
   computer usable program code for analyzing the set of trace log files for the selected technologies to form an analysis; and
   computer usable program code for generating a report that includes the analysis of the set of trace log files.

20. The computer program product of claim 19, further including:
   computer usable program code for sending the report to a set of individuals.

* * * * *